March 23, 1954
F. E. FULTON
2,673,095
VEHICLE BUMPER TOW CLAMP
Filed June 23, 1952
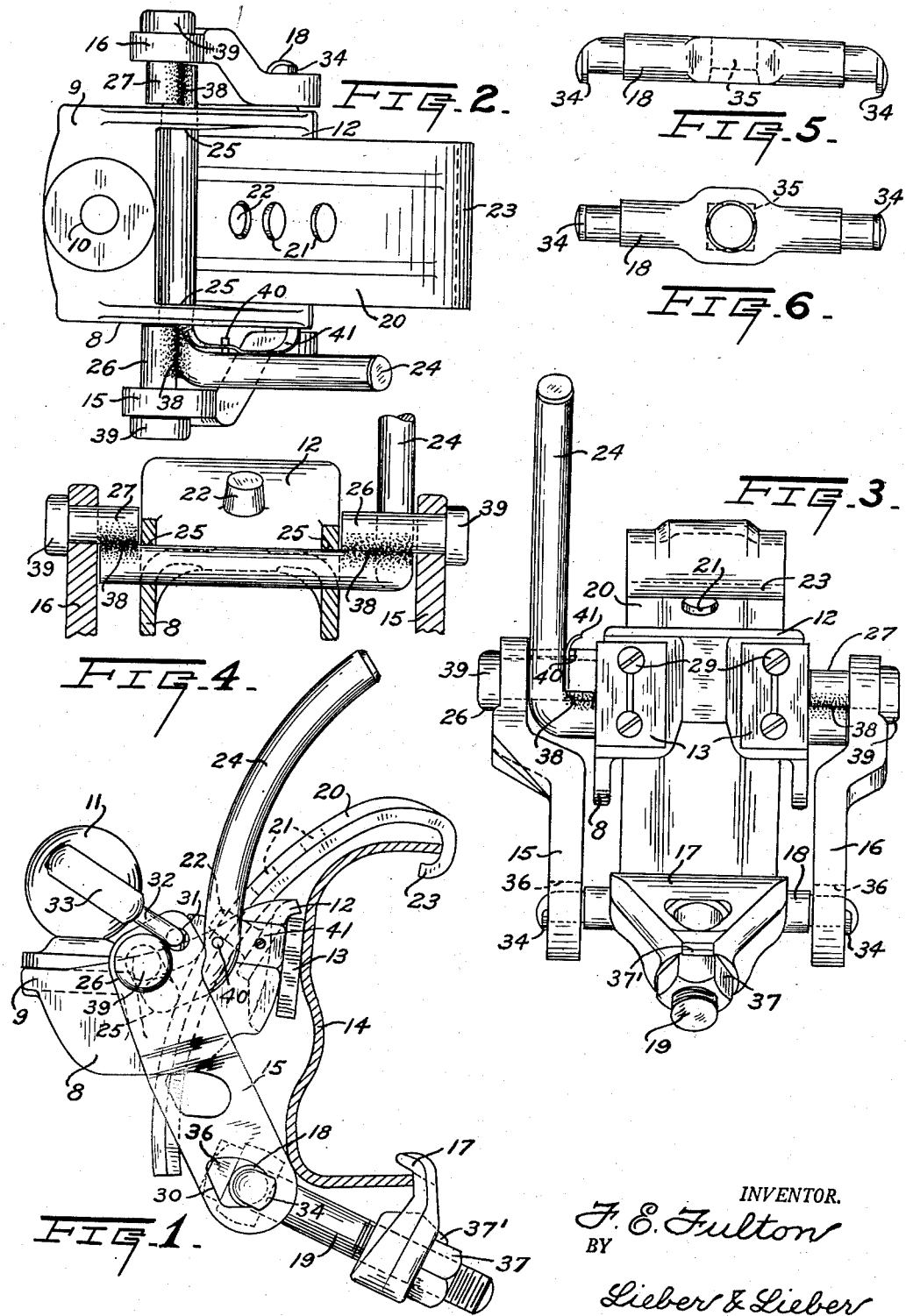
INVENTOR.
F. E. Fulton
BY
Lieber & Lieber
ATTORNEYS.

Patented Mar. 23, 1954

2,673,095

UNITED STATES PATENT OFFICE 2,673,095

VEHICLE BUMPER TOW CLAMP

Floyd E. Fulton, Wauwatosa, Wis., assignor to The Fulton Company, West Allis, Wis., a corporation of Wisconsin Application June 23, 1952, Serial No. 295,075

9 Claims. (Cl. 280—502)

The present invention relates generally to improvements in mechanisms for interconnecting a pair of normally separated vehicles in a manner whereby one of the vehicles may be towed by the other, and relates more specifically to improvements in the construction and operation of tow clamps especially adapted to be secured to a vehicle bumper.

The primary object of this invention is to provide an improved vehicle bumper tow clamp which is simple and durable in construction, reliable in operation, and which may be readily applied to or removed from vehicle bumpers of various shapes.

As shown and described in the Riemann and Bolmes Patent No. 2,506,109 granted May 2, 1950, it has heretofore been proposed to provide a vehicle bumper tow clamp comprising a draft frame having a resilient pad for engaging the front medial portion of a bumper bar, an elongated inverted U-shaped member swingably suspended from the frame and having a lower clamping jaw adjustable along its lower swinging ends for engaging the lower edge of the bumper, and an arcuate clamping jaw adjustably associated with the frame and provided with an upper end hook adapted to clampingly engage the upper edge of the bumper. While this prior device was well adapted for cooperation with bumper bars of various shapes and sizes, and functioned in a satisfactory manner when once having been properly installed, it was rather difficult and tedious to finally apply and to quickly remove the same, and the clamp could not be thus manipulated without the use of special tools applicable to relatively inaccessible parts of the assemblages.

It is therefore an important object of the present invention to provide various improvements in vehicle bumper tow clamps of the type disclosed in the prior patent above identified, whereby the objectionable features thereof are entirely eliminated.

Another important object of this invention is to provide an improved bumper type of vehicle tow clamp, which may be conveniently adjusted to fit diverse forms of bumper bars, and which is quickly attachable to or removable from such bars at the will of the user.

A further important object of the invention is to provide a sturdy bumper tow clamp which may be rapidly applied to a bumper bar and locked in clamped condition so as to prevent release or unauthorized removal thereof.

Still another object of the invention is to provide a tow clamp unit which may be readily assembled or dismantled for compact packing and shipment, and which may be manufactured at moderate cost for use with bumpers of diverse shapes and sizes.

These and other more specific objects and advantages of the present invention will be apparent from the following description, from which it will be noted that the gist of the improvement is the provision of a vehicle bumper tow clamp comprising, a draft frame having one end portion adapted for attachment to either a hauling or trailing vehicle and its opposite end portion provided with a bearing block adapted to engage the medial outer face of the front or rear bumper of a trailing or hauling vehicle, a pair of spaced links pivotally suspended from the draft frame and having a lower clamping jaw adjustably associated with the lower swingable ends thereof and adapted to clampingly engage the lower edge of the bumper, an upwardly extending member adjustably associated with the draft frame and having a clamping jaw at its upper end adapted to clampingly engage the upper edge of the bumper, and a manipulating handle element pivotally mounted upon the draft frame and having eccentric end portions coacting with the links, the handle element being swingable relative to the frame to simultaneously force the block and the two jaws into firm clamping engagement with the bumper at three spaced points.

A clear conception of the improved features constituting the present invention, and of the construction and operation of a typical vehicle bumper tow clamp unit embodying the same, may be had by referring to the drawing accompanying and forming a part of this specification wherein like reference characters designate the same or similar parts in the various views.

Fig. 1 is a side view of one of the improved tow clamp assemblages showing the same clamped to a sheet metal bumper bar of typical cross section and which is shown in section;

Fig. 2 is a top view of the improved clamp assembly of Fig. 1, but with the bumper omitted;

Fig. 3 is a rear elevation of the same assemblage with the bumper bar also omitted;

Fig. 4 is a transverse fragmentary section through the unit taken closely adjacent to and showing the manipulating element, but with the upper clamping jaw omitted;

Fig. 5 is a side view of the cross-beam which connects the lower swinging ends of the suspension links for the lower jaw; and Fig. 6 is a bottom view of the cross-beam of Fig. 5.

While the invention has been shown and described herein as having been embodied in a tow clamp unit especially adapted to cooperate with the bumpers of various types of automobiles, it is not desired to unnecessarily restrict its utility by virtue of this limited showing; and it is also contemplated that specific descriptive terms employed herein be given the broadest possible interpretation consistent with the disclosure.

Referring to the drawing, the improved bumper tow clamp unit shown therein, comprises in general a draft frame 8 the forward portion of which is provided with a platform 9 having an opening 10 therein for the reception of a tow coupling ball 11 while its rear portion is provided with a transverse wall 12 carrying a pair of spaced blocks 13 adapted to engage the medial front face of a bumper bar 14; a pair of spaced links 15, 16 pivotally suspended at their upper ends from the medial portion of the frame 8 and having a lower clamping jaw 17 adjustably associated with their lower swingable ends by means of a cross-beam 18 and a bolt 19, the jaw 17 being clampingly engageable with the lowermost edge of the bumper bar 14; an upwardly extending arcuate member 20 having a series of holes 21 for receiving a lug 22 extending forwardly from the mid-portion of the frame wall 11, and being provided with a clamping jaw 23 at its upper extremity clampingly engageable with the uppermost edge of the bumper bar 14; and a manipulating element or lever 24 pivotally journalled in bearings 25 carried by the mid-portion of the frame 8 and having eccentric opposite end portions 26, 27 coacting with openings in the upper portions of the links 15, 16 respectively.

The draft frame 8 is preferably formed of metal and of sturdy construction with the platform 9 and the rear wall 12 formed integral with its opposite side walls; and the bearing blocks 13 may be formed of fibre or rubber so as not to mar the bumper bar 14, and are fastened to the frame wall 12 by screws 29 as shown in Fig. 3. The coupling ball 11 should also be firmly attached to the front platform 9 of the frame 8, and the lug 22 should also be rigidly united with the rear wall 12 of the frame 8 and is preferably tapered as shown.

The spaced links 15, 16 which are pivotally suspended at their upper ends from the eccentric portions 26, 27 of the manipulating lever 24, are provided at their lower end portions with irregular but similar alined openings 30 and are offset toward each other at the bottom, as illustrated in Figs. 2 and 3. These links 15, 16 are also formed of durable metal, and the upper portion of the link 15 is provided with a hole 31 adapted for the reception of the U-shaped latch 32 of a pad lock 33 as depicted in Fig. 1. The cross-beam 18 which normally interconnects the lower ends of the two links 15, 16 is preferably constructed as shown in Figs. 5 and 6 with local end flanges 34 adapted to be inserted through the openings 30 and to subsequently hook over the outer sides of the links 15, 16, and this beam has a central square hole 35 therethrough. The shank of the bolt 19 adjacent to its head 36 is provided with a square section adapted to fit the square beam hole 35 in order to prevent the bolt 19 from rotating when the adjusting nut 37 is applied to the lower bolt extremity. The lower jaw 17 has a central opening penetrated by the bolt 19, and is widened at the top for engagement with a substantial portion of the lower bumper edge and is also provided with a projection 37' which is engageable with a face of the nut 37 to prevent the latter from turning when the clamp is in use.

The upwardly extending arcuate member 20 is preferably formed of durable sheet metal, and is of sufficient length to accommodate either front or rear vehicle bumper bars 14 of various shapes and transverse widths. The upper bumper engaging jaw 23 of the member 20 is formed integral with the curved body portion thereof, and the latter should be provided with a series of the holes 21 which are adapted to interchangeably receive the tapered lug 22 of the rear frame wall 12 in order to permit convenient variation in the distance between the upper and lower clamping jaws 23, 17. The member 20 is adapted to be drawn into clamping engagement with the upper bumper edge and with the lug 22 by rearward swinging movement of the manipulating lever 24, and may in some instances contact the upper curved edge of the frame wall 12.

The manipulating element or lever 24 comprises a curved handle portion formed integral with but projecting upwardly away from a pivot portion which is journalled in the frame bearings 25, and the two coaxial end portions 26, 27 which are disposed eccentrically of and are firmly attached to the pivot portion as by welding 38 or otherwise, see Figs. 2, 3 and 4. Both of the eccentric end portions are provided with outer heads 39 for preventing spreading of the links 15, 16 which are pivotally suspended therefrom, and the handle portion of the lever 24 has a pin 40 projecting laterally therefrom and engageable with a notch in a leaf spring 41 secured to one side of the frame 8 in order to prevent the lever 24 from being swung rearwardly beyond a predetermined position. The lever 24 is also prevented from being swung forwardly so as to release the clamp, by the pad lock 33, in order to prevent unauthorized removal of the unit.

When the various parts of the improved bumper tow clamp have been properly constructed as above described, the links 15, 16 will be permanently suspended from the adjacent eccentric end portions 26, 27 of the manipulating lever 24 and the latter will be permanently journalled in the frame 8, but the cross-beam 18 may be freely removed from the lower openings 30 of the side links 15, 16 by unhooking the end flanges 34, the nut 37 may be adjusted and brought into engagement with the projection 37', and the arcuate member 20 may also be readily removed from or adjusted relative to the lug 22, before the unit is applied to a vehicle bumper bar 14. In order to apply the device to a front bumper bar 14, the jaws 17, 23 should be initially applied and adjusted relative to the frame 8 so as to loosely engage the adjacent lower and upper edges of the bar 14 while the lever 24 is swung into approximately horizontal position near the ball 11, by selecting the proper hole 21 for cooperation with the lug 22, and by adjusting the nut 37 and causing it to engage the projection 37' and to properly position the lower jaw 17.

After the unit has been thus loosely applied to the bumper bar 14, the lever 24 may be swung upwardly and rearwardly about the axes of the bearings 25, thereby causing the eccentric end portions 25, 26 of the lever to swing upwardly and to simultaneously move the jaws 17, 23 and the blocks 13 into firm clamping engagement with the bumper bar 14. As the lever 24 reaches the position shown in Fig. 1, the pin 40 snaps into the detent in the spring 41 and holds the lever in clamping position, and the pad lock 33 may thereafter be applied to the hole 31 of the link 15 in order to prevent unauthorized release and removal of the tow clamp. However, when the pad lock 33 has been removed, the tow clamp assemblage may be just as quickly and conveniently removed by merely depressing the leaf spring 41 to release the lever 24 and by thereafter swinging the latter forwardly and downwardly into approximately horizontal position.

From the foregoing detailed description of the construction and operation of the unit, it will be apparent that the invention provides a tow clamp which besides being simple, compact and durable in construction, may be adjusted and manipulated without the use of any tools to fit bumper bars 14 of various sizes and shapes. The adjustments and the application or removal of the assemblage to a bumper, may be rapidly effected, and by making the jaws 17, 23 and their carrying elements readily removable, the clamping unit may be compactly packed for merchandising purposes. The various parts of the improved structure may be durably constructed and easily assembled to produce a moderate priced unit adapted for application to various styles of bumpers, and has proven highly satisfactory and successful in actual use. The improved clamp assembly may obviously be applied to either the front or rear bumper of a vehicle which is being towed or hauling a trailer, and the terms "front" and "rear" and "forwardly" and "rearwardly" as used herein, are merely relative terms and do not limit the use of the device.

It should be understood that it is not desired to limit this invention to the exact details of construction and operation of the vehicle bumper tow clamp, specifically shown and described herein, for various modifications within the scope of the appended claims may occur to persons skilled in the art.

I claim:

1. A vehicle bumper tow clamp comprising, a draft frame having its forward portion formed for attachment to a hauling vehicle and its rear portion provided with a bearing block adapted to engage the medial front face of the bumper of a trailing vehicle, a pair of spaced links located on opposite sides of said frame and having lower clamping means adjustably associated with the lower swingable ends thereof and adapted to clampingly engage the lower edge of the bumper, an upwardly extending member adjustably associated with said frame and having clamping means at its upper end adapted to clampingly engage the upper edge of the bumper, and a manipulating element pivotally mounted upon said frame and having eccentric end portions coacting with said links, said element being swingable relative to said frame to simultaneously force said block and said clamping means into firm clamping engagement with the bumper.

2. A vehicle bumper tow clamp comprising, a draft frame having its forward portion formed for attachment to a hauling vehicle and its rear portion provided with a bearing block adapted to engage the medial front face of the bumper of a trailing vehicle, a pair of spaced links disposed on the opposite sides of said frame and having a lower clamping jaw adjustably associated with the lower swingable ends thereof and adapted to clampingly engage the lower edge of the bumper, an upwardly extending member adjustably associated with said frame and having a clamping jaw at its upper end adapted to clampingly engage the upper edge of the bumper, and a manipulating element journalled for rotation upon said frame and having eccentric end portions coacting with the upper end portions of said links, said element being rotatable relative to said frame to simultaneously force said block and said jaws into firm clamping engagement with the bumper.

3. A vehicle bumper tow clamp comprising, a draft frame having its forward portion formed for attachment to a hauling vehicle and its rear portion provided with a transverse wall, a bearing block secured to said wall and being adapted to engage the medial front face of the bumper of a trailing vehicle, a pair of spaced links located on the opposite sides of said frame and having a lower clamping jaw adjustably associated with the lower ends thereof and adapted to clampingly engage the lower edge of the bumper, an upwardly extending arcuate member adjustably associated with said frame and having a clamping jaw at its upper end adapted to clampingly engage the upper edge of the bumper, and a manipulating element journalled upon said frame and having eccentric end portions coacting with upper portions of said links, said element being oscillatable relative to said frame to simultaneously force said block and said jaws into firm clamping engagement with the bumper.

4. A vehicle bumper tow clamp comprising, a draft frame having its forward portion formed for attachment to a hauling vehicle and its rear portion provided with a bearing block adapted to engage the medial front face of the bumper of a trailing vehicle, a pair of spaced links located on opposite sides of said frame and having a lower clamping jaw adjustably associated with the lower ends thereof and adapted to clampingly engage the lower edge of the bumper, an upwardly extending member adjustably associated with said frame and having a clamping jaw at its upper end adapted to clampingly engage the upper edge of the bumper, and a manipulating lever mounted upon said frame and having eccentric end portions coacting with said links, said lever being swingable relative to said frame to cause said eccentric end portions to simultaneously force said block and both of said jaws into firm clamping engagement with the bumper.

5. A vehicle bumper tow clamp comprising, a draft frame having its forward portion formed for attachment to a hauling vehicle and its rear portion provided with a bearing block adapted to engage the medial front face of the bumper of a trailing vehicle, a pair of spaced links disposed on opposite sides of said frame, a transverse beam connecting the lower swingable ends of said links, a lower clamping jaw adjustably suspended from said beam and adapted to clampingly engage the lower edge of the bumper, an upwardly extending member adjustably associated with said frame and having a clamping jaw at its upper end adapted to clampingly engage the upper edge of the bumper, and a manipulating lever journalled upon said frame and having eccentric end portions coacting with upper portions of said links, said lever being swingable relative to said frame to simultaneously force said block and said jaws into firm clamping engagement with the bumper.

6. A vehicle bumper tow clamp comprising, a draft frame having its forward portion formed for attachment to a hauling vehicle and its rear portion provided with a bearing block adapted to engage the medial front face of the bumper of a trailing vehicle, a pair of spaced links disposed on the opposite sides of said frame and having lower openings therein, a transverse beam having end portions insertable through said openings, a bolt suspended from the mid-portion of said beam, a lower clamping jaw adjustably associated with said bolt and adapted to clampingly engage the lower edge of the bumper, an upper member adjustably associated with said frame and having a clamping jaw at its upper end adapted to clampingly engage the upper edge of the bumper, and a manipulating lever pivotally mounted upon said frame and having eccentric end portions coacting with said links and rotatable to simultaneously force said block and said jaws into firm clamping engagement with the bumper.

7. A vehicle bumper tow clamp comprising, a draft frame having its forward portion formed for attachment to a hauling vehicle and its rear portion provided with a bearing block adapted to engage the medial front face of the bumper of a trailing vehicle, a pair of spaced links disposed on opposite sides of said frame, a lower clamping jaw adjustably associated with the lower ends of said links and adapted to clampingly engage the lower edge of the bumper, an upwardly extending member adjustably associated with said frame and having a clamping jaw at its upper end adapted to clampingly engage the upper edge of the bumper, a manipulating lever pivotally mounted upon said frame and having eccentric end portions cooperable with said links to simultaneously force said block and said jaws into firm clamping engagement with the bumper, and latch means for stopping and holding said lever in clamping position.

8. A vehicle bumper tow clamp comprising, a draft frame having its forward portion formed for attachment to a hauling vehicle and its rear portion provided with a bearing block adapted to engage the medial front face of the bumper of a trailing vehicle, a pair of spaced links disposed on opposite sides of said frame, a lower clamping jaw adjustably associated with the lower ends of said links and adapted to clampingly engage the lower edge of the bumper, an upwardly extending member adjustably associated with said frame and having a clamping jaw at its upper end adapted to clampingly engage the upper edge of the bumper, a manipulating lever pivotally mounted upon said frame and having eccentric end portions cooperable with said links to simultaneously force said block and said jaws into firm clamping engagement with the bumper, and a lock cooperable with one of said links and with said lever to prevent clamp releasing movement of the latter.

9. A vehicle bumper tow clamp comprising, a draft frame having its forward portion formed for attachment to a hauling vehicle, a pair of spaced links located on opposite sides of said frame and having lower clamping means adjustably associated with the lower swingable ends thereof and adapted to clampingly engage the lower edge of the bumper, an upwardly extending member adjustably associated with said frame and having upper clamping means adapted to clampingly engage the upper edge of the bumper, and a manipulating element pivotally mounted upon said frame and having eccentric end portions coacting with said links, said element being swingable relative to said frame to simultaneously force said lower and upper clamping means into firm clamping engagement with the bumper.

FLOYD E. FULTON.

References Cited in the file of this patent

UNITED STATES PATENTS

| Number | Name | Date |
|---|---|---|
| 2,306,007 | Thorp | Dec. 22, 1942 |
| 2,432,249 | Pearson | Dec. 9, 1947 |
| 2,440,877 | Russell | May 4, 1948 |
| 2,506,109 | Riemann | May 2, 1950 |
| 2,525,505 | Wiedman | Oct. 10, 1950 |